United States Patent [19]

Ketner

[11] Patent Number: 4,887,637

[45] Date of Patent: Dec. 19, 1989

[54] PRESSURE COMPENSATING FLOW CONTROL DEVICE

[76] Inventor: Eugene N. Ketner, Box 836, Graham, Tex. 76046

[21] Appl. No.: 255,805

[22] Filed: Oct. 6, 1987

Related U.S. Application Data

[62] Division of Ser. No. 525,564, Aug. 22, 1983, abandoned, and Ser. No. 722,867, May 23, 1985, abandoned.

[51] Int. Cl.$^4$ .................. G05D 7/01; F16K 17/24
[52] U.S. Cl. ....................................... 137/504; 138/46
[58] Field of Search ........... 137/498, 503, 504, 505.13, 137/517; 138/43, 46, 45

[56] References Cited

U.S. PATENT DOCUMENTS

| | | | |
|---|---|---|---|
| 1,050,763 | 1/1913 | Cooper | 137/503 |
| 2,584,418 | 2/1952 | Branson | 137/504 |
| 3,114,388 | 12/1963 | Hoen | 251/337 X |
| 3,292,656 | 12/1966 | Armstrong | 137/504 X |
| 3,697,002 | 10/1972 | Parkison | 137/504 |
| 3,752,183 | 8/1973 | Griswold | 137/504 |

*Primary Examiner*—Stephen M. Hepperle
*Attorney, Agent, or Firm*—Marcus L. Bates

[57] ABSTRACT

A pressure compensating flow control device for conserving water usage by controlling the water flow rate from faucets located in homes and commercial properties. The device is an inline flow control apparatus which controls the flow of water going to sinks, showers, and lavatories in a manner to conserve water usage and is therefore especially energy efficient when used to control the flow of heated water. The control device is pressure compensating in a manner which tends to provide a constant volumetric flow rate as the upstream pressure fluctuates, and as the faucet is progressively opened. The control device includes a housing within which two mutually reciprocating parts are biased apart by a spring means so that as the upstream pressure increases, the two parts move towards one another, thereby compressing the spring means therebetween, and increasing the friction to flow therethrough. When the faucet is progressively closed, the upstream pressure is reduced, the two parts of the device move apart in response to dissipation of the stored energy within the spring means, thereby increasing the friction to flow therethrough. This action enables the control device to modulate the flow through the individual water faucet outlets to provide a constant water flow rate as the faucet is moved from a slightly opened to a fully opened position.

6 Claims, 1 Drawing Sheet

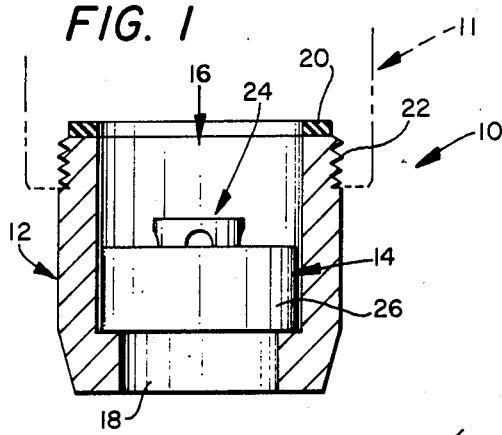
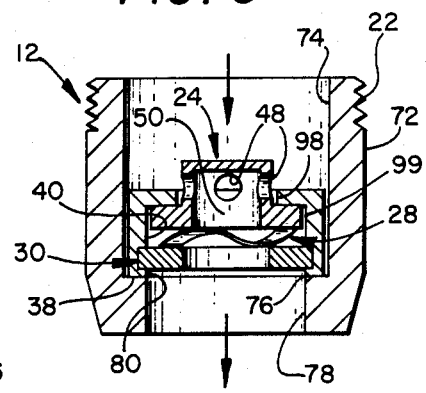
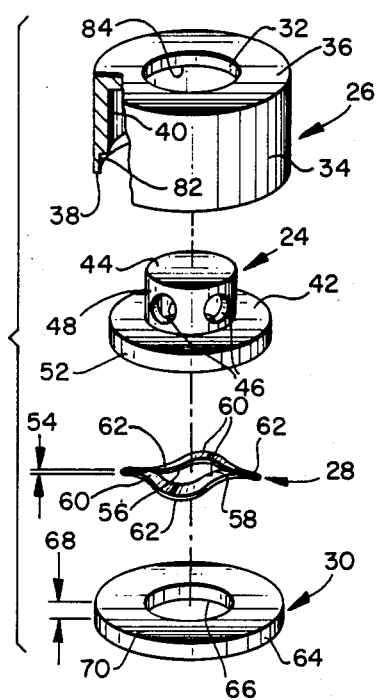
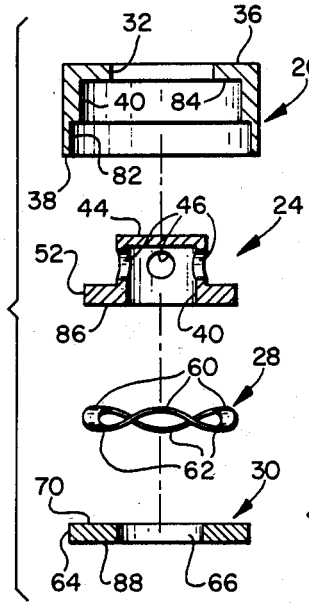
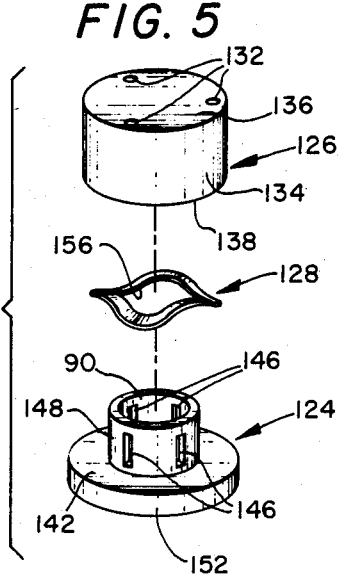
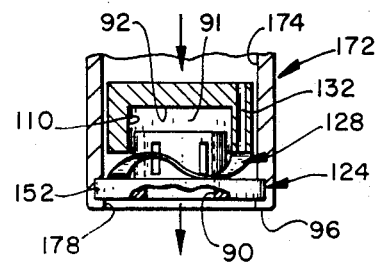
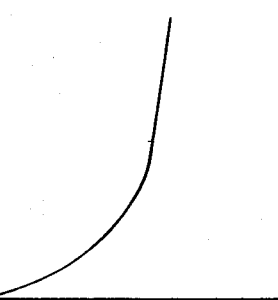

PRESSURE COMPENSATING FLOW CONTROL DEVICE

This application is a division of application Ser. No. 525,564, filed Aug. 22, 1983, now abandoned, and a division of application Ser. No. 722,867, filed May 23, 1985, now abandoned.

REFERENCE TO RELATED DISCLOSURE DOCUMENT

Reference is made to Disclosure Document #115,704, filed Mar. 17, 1983, for Inventor E. Neil Ketner, entitled "FLOW CONTROL DEVICE—PRESSURE COMPENSATING".

BACKGROUND OF THE INVENTION

Most modern convenience faucet spouts, such as used in bathrooms, for example, have a threaded end located at the outlet thereof for the purpose of threadedly mating with a spout attachment. Most spout attachments are designed to be attractive in appearance, to create a desirable flow pattern, and sometime to admix air with the stream of flowing water. It is known to attach various different flow control apparatus at the threaded end of a faucet as evidenced by the following prior art: U.S. Pat. Nos. 4,133,350, 3,995,664, and 4,119,276.

Of the above prior art, Nelson, U.S. Pat. No. 3,995,664 requires an elastomeric member to sealingly engage the inside wall surface of a housing within which it is mounted. The elastomer bears against a series of radial ports formed in opposed disks to thereby control the flow of water therethrough in response to upstream pressure variations. Nelson, U.S. Pat. Nos. 4,113,350 and 4,119,276 are similar in construction. Reference is made to these patents and to the art cited therein for future background of this invention.

It is difficult to provide a flow control device with a suitable elastomer having a satisfactory spring force which can endure hot chlorinated water, and especially hot chlorinated water having an appreciable salt content, such as is often encountered in large cities, for example. Accordingly, it would be desirable to have made available an all metal, pressure compensating, flow control device which can be retrofitted or initially installed at the outlet end of most convenience faucets. Moreover, it would be desirable to be able to fabricate the internal working parts of the flow control device from stainless steel and other desirable heat and corrosive resistant alloys. A pressure compensating flow control device having these desirable novel attributes is the subject of the present invention.

SUMMARY OF THE INVENTION

This invention comprehends a water flow control device having an inlet adapted to be removably attached to the outlet end of a commercially available faucet. The control device of the present invention comprises a modulating control valve having a retainer housing, a spool, a spring means in the form of a bent washer, and means by which the described parts are maintained in proper assembled relationship.

The spool of the control device includes a reduced diameter portion reciprocatingly received within an opening formed inside of the retainer housing. A flow passageway extends through a reduced diameter part of the spool. The spool, in conjunction with the spring means and housing, forms a modulating valve assembly.

The spring means preferably is in the form of a bent or deformed thin annular disk which stores energy as it is compressed between the retainer housing and the spool, and releases energy as the applied force is reduced.

As the faucet is progressively opened, the upstream pressure is progressively effected against the upstream side of the flow control device. The resultant force of this action causes the retainer housing and spool to move respective to one another, thereby progressively storing energy within the spring means. The relative movement between the retainer housing and the spool progressively reduces the effective port size leading through the spool, thereby progressively increasing the friction to the flow of fluid through the flow control device. As the upstream pressure is reduced, the retainer housing and spool move towards the no flow position as the stored energy of the spring means effects opposite relative movement between the retainer housing and the spool.

In the preferred form of the invention, the spring means is in the form of an annular washer bent into a configuration which describes a sinusodial wave pattern when viewed in side elevation. The spring means is compressively captured against a large annular flange located at the lower end of the reduced diameter portion of the spool. The reduced diameter part of the spool is ported. The retainer housing has an axial passageway through which the reduced diameter part of the spool extends. The retainer housing further includes a depending skirt member within which at least part of the spool is captured. The spool therefore bears against the spring means, while an inturned portion of the skirt means bottom supports the spring means. The reciprocal movement of the reduced diameter part of the spool alternately exposes and obscures the ports to the upstream supply, thereby varying the resistance to flow though the device, so the modulated fluid flow is achieved which is of a reasonable magnitude for satisfactorily enjoying water usage.

In the second embodiment of the invention, the retainer housing is provided with a lower skirt member which terminates in a circumferentially extending edge portion. The lower edge of the skirt bears against an annular spring means. The apparatus includes a spool having an increased diameter portion formed thereon which forms a boss or shoulder for supporting the spring means. The spring means is uniquely captured between the lower edge of the skirt and the shoulder of the spool, and the retainer housing is forced by the pressure drop thereacross to move towards and away from the spool. The skirt means covers a radial port formed through the reduced diameter part of the spool, thereby modulating fluid flow through the apparatus in response to relative movement between the spool and housing.

Accordingly, a primary object of the present invention is the provision of an all metal, pressure compensating, flow control device which can readily be fastened to the outlet end of a faucet.

Another object of the invention is to provide a flow control device for water flow control which can be placed in series relationship respective to a flow line and thereby modulate the rate of flow therethrough.

A further object of this invention is to disclose and provide a pressure compensating flow control device comprised of only three moving parts arranged respective to one another to vary the friction to flow therethrough in proportion to upstream water pressure.

A still further object of this invention is the provision of a flow control device which can be retrofitted to existing faucets so that a relatively constant flow rate is realized under varying upstream pressure conditions.

Another and still further object of this invention is the provision of apparatus for providing a relatively constant flow rate of water as a main faucet valve is progressively opened.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 1 is a part cross-sectional view of a flow control device made in accordance with the present invention;

FIG. 2 illustrates a perspective, disassembled view of the apparatus disclosed in FIG. 1;

FIG. 3 is a cross-sectional view showing further details of the assembled apparatus disclosed in FIGS. 1 and 2;

FIG. 4 is a cross-sectional, disassembled view of the apparatus disclosed in FIGS. 1-3;

FIG. 5 is a disassembled, perspective view of another embodiment of the present invention;

FIG. 6 is a cross-sectional, assembled view of the apparatus disclosed in FIG. 5; and, FIG. 7 is a plot showing flow rate versus pressure of a flow control device.

DETAILED DESCRIPTION OF THE PREFERRED EMBODIMENTS

FIG. 1 of the drawings discloses a flow control device for a water faucet comprising a spout attachment 10 for attachment to the outlet end of a faucet 11. The device 10 includes an attachment housing 12 having an axial flow path formed therethrough within which a flow control device 14, made in accordance with the present invention, is suitably mounted in a removable and captured relationship therewithin. Numeral 16 generally indicates the direction of flow through the flow control device 14. The attachment housing 12 terminates in a controlled outlet 18.

An annular gasket 20, which can take on several different forms, provides a seal means between the attachment housing 12 and the outlet of faucet 11. A standard threaded surface 22 enables the attachment housing 12 to be conveniently affixed to the standard outlet of faucet 11.

In FIGS. 1-4, it will be noted that the flow control device 14 includes a spool 24 received in captured relationship within a retainer housing 26, the details of which will be more fully discussed hereinafter.

As disclosed in FIGS. 2-4, the flow control device 14 of FIG. 1 is seen to include the before mentioned spool 24 and retainer housing 26. A spring means 28 is interposed between the spool 24 and a retainer washer 30. The retainer housing 26 includes an axial passageway 32, and a downwardly depending skirt member 34 which circumferentially extends 360° about the longitudinal axis thereof and thereby forms the outer cylindrical surface of the retainer housing 26. The top horizontal surface 36 of the retainer housing 26 preferably is made integrally respective to the skirt member 34. The skirt member terminates at the circumferentially extending edge portion 38. Numeral 40 indicates the interior wall surface of the skirt member.

The spool 24 includes a large inside diameter part in the form of a lower annular flange or boss or shoulder 42 which is spaced from an upper circular plate 44 by the illustrated apertured extension 48. The extension 48 includes at least one and preferably a plurality of radially spaced apart ports 46 which communicate with the interior chamber 50 thereof.

The outer circumferentially extending edge portion 52 of the before mentioned lower annular flange 42 is guidably received in a slidable and reciprocating manner by the interior walls 40 of the retainer housing 26.

Looking now to the details of the spring means 28, numeral 54 indicates the thickness thereof, which preferably is made between the limits of 0.005-0.015 inches. The spring means preferably is in the form of a bent-up washer-like disk having an inside diameter 56 and an outside diameter 58. The outside diameter preferably is within the range of 0.20-0.35 inches. Numeral 60 and 62, respectively, indicates the hills and valleys, respectively, which result from bending the washer out of a horizontal plane at selected areas so that the resulting configuration, when viewed in side elevation, is in the form of a sinusodial wave pattern. There preferably are three hills and three valleys, although additional hills and valleys can be formed, if desired.

A retainer washer 30 is provided with an axial passageway 66 through which fluid can flow. The washer is of any suitable thickness such as indicated by numeral 68. The retainer washer is in the form of an annular disk having opposed parallel faces, one of which is indicated by the numeral 70 in FIG. 2. In FIG. 3, the housing 12 is seen to include an outer cylindrical wall surface 72 opposed to an inner cylindrical wall surface 74. A shoulder or step 76 is formed between wall surfaces 74 and 78.

As particularly seen illustrated in FIG. 3, the lower edge portion 38 of the skirt 34 is turned radially inwardly at 80, thereby capturing the retainer washer 30 by the lower terminal end of the skirt.

As best seen illustrated in FIG. 4, the inner lower marginal peripheral surface of the skirt is increased in diameter at 82 to thereby reduce the thickness of the lower marginal end thereof, thereby facilitating turning the lower marginal end thereof inwardly in the manner indicated by the numeral 80 seen in FIG. 3. As seen in FIG. 4, the lower surface 84 of the retainer housing 26 is opposed to upper surface 36 thereof. Numeral 86 indicates the lower flat of the lower annular flange of member 24. The retainer washer 30 includes a lower surface 88 which is opposed to the before mentioned top surface 70. The marginal outer peripheral surface of the washer is captured within the groove 82 in the indicated manner of FIG. 3.

The component parts illustrated in FIGS. 2 and 4 are assembled in the illustrated manner of FIG. 3, and the entire apparatus is connected to a faucet outlet in the illustrated manner of FIG. 1.

In operation, before the valve (not shown) associated with the faucet 11 is opened, the spring means 28 forces the spool 24 in an upstream direction respective to aperture 32 of the retainer housing 26, and accordingly, the radial ports 46 will be fully exposed to the upstream fluid supply. As the faucet is opened, fluid flow occurs through the fully open ports 46, into the interior 50 of the spool, whereupon fluid flow continues down through the passageway 56 of the spring means, through the passageway 66 of the retainer washer, and through the outlet 78 formed in the attachment housing. This is representative of the minimum resistance configuration of the flow control device set forth in the first embodiment of FIGS. 2-4 of the present invention.

When the upstream pressure increases as a result of the faucet being more fully opened, or similarly, as a result of increased supply pressure, fluid pressure is effected against the bonnet and subsequently against the upper surface 42 of the annular flange, and consequently the pressure differential across the device forces the spool to move downstream against the spring means 28, thereby storing energy within the spring means 28 and moving the radial ports 46 downstream respective to the axial passageway 32 of the retainer housing. This action partially "closes" the radial ports 46 due to the presence of the adjacent circumferentially extending edge portion at the aperture. Hence, the flow rate through the flow control device is reduced proportionally to the pressure effected on the upstream side of the bonnet.

Careful selection of the spring force of spring means 28 in conjunction with the size of axial passageway 32 and ports 46 provide a pressure versus flow rate curve of a relatively flat configuration that will slightly increase in flow rate with increased pressure; and, as the faucet 11 is further opened, an increased flow rate will be sensed by a person. However, the delivery in gallons per minute through the device as the faucet is progressively further opened maintains the characteristics set forth in the curve illustrated in FIG. 7.

It should be noted in the embodiment set forth in FIG. 3 that a minimum flow can occur through the annular areas 98 and 99, however, the major flow occurs through ports 46 of the spool, regardless of the relative position of the spool and the retainer housing.

The Second Embodiment of the Invention

FIGS. 5 and 6 set forth the second embodiment of the present invention. In this second embodiment, like or similar numerals refer to like or similar elements found in the first embodiment of the invention. In FIGS. 5 and 6, the retainer housing 126 includes a plurality of radially spaced inlet ports 132 which form longitudinally disposed parallel flow paths from the face 136 of the housing 126, down through the lower edge portion 138 of the skirt 134. The retainer housing 126 includes an interior end wall 92 which forms the blind end of a counterbore 91. The counterbore 91 forms a working chamber for the extension 148 of the spool 124. The spool 124 includes a longitudinally extending axial passageway 90, and an outer surface area through which a series of radial ports or slots 146 extend for modulating the flow therethrough. The slots therefore communicate the axial passageway 90 with the exterior of the extension 148.

The spring means 128 preferably is in the form of the before mentioned bent washer which is interposed between the upper surface of the lower annular flange 142 of the spool and the circumferentially extending lower edge 138 of the retainer housing. The lower edge portion 138 of the retainer housing forms a shoulder which bears against one surface of the spring means. The lower annular flange 142 of the spool bottom supports the other or obverse side of the annular spring means.

The inturned lower marginal edge portion 96 of the housing 172 captures the entire assembly therewithin.

As pressure is effected upstream of the device, flow occurs through longitudinal passageways 132, through the uncovered portion of the radial slots 146, into the axial passageway 90, and through the outlet formed by edge portion 178 of the attachment housing. As the upstream pressure increases, the pressure differential across the retainer housing forces the lower edge portion of the skirt to bear against the annular spring member with increased force thereby storing energy therein. This action causes the interior of the lower marginal end of the skirt to partially obscure the radial ports 146, thereby reducing the area of the flow passageway through the device 12 and restricting flow therethrough in proportion to the upstream pressure effected upon the apparatus. Conversely, reduction of the upstream pressure removes part of the pressure drop across the device, thereby enabling the stored energy within the spring means to force the retainer housing to move upstream, whereupon the radial ports 146 are moved towards the uncovered position and the friction to flow is thereby reduced.

Accordingly, modulating flow occurs through the flow control device of the second embodiment. The flow rate is proportional to the upstream pressure. Flow control is achieved by relative movement between the retainer housing and the spool, with the spool and housing being biased apart by the spring means 128.

The present invention provides a flow control device 10 or 172 for attachment to the outlet of a faucet 11; comprising, an attachment housing having an inlet end and an outlet end through which a regulated flow of fluid exists. A retainer housing 26, 126; a spool 24, 124; and a spring means 28, 128; are all axially aligned respective to one another. At least part of the spool is received within the retainer housing in axially aligned relationship therewith.

The spool 24, 124, includes a large outside diameter part 52, 152, and a small outside diameter part 48, 148. The retainer housing includes an upper part 36, 136 from which a skirt member 34, 134 depends. The upper part of the spool is reciprocatingly received at 32, within the retainer housing.

The spring means 28, 128 is mounted respective to the spool and retainer housing to cause energy to the stored within the spring means when a relatively high pressure drop across the apparatus moves the spool respective to the retainer housing. The spring means thereafter causes the spool and retainer housing to be moved apart from one another when relatively low upstream pressure is effected on the apparatus.

In the second embodiment of the invention, the radial ports 146 are in the form of slots which are longitudinally disposed respective to the longitudinal axial centerline of the apparatus, thereby providing a suitable response rate as the thimble of the spool reciprocates within the working cavity 91 of the retainer housing.

In each of the embodiments of the invention, the various illustrated configuration of ports can be charged in design to impart different flow characteristics into the assembled apparatus. For example, it is considered to be within the comprehension of this invention to taper the sidewall 48 of the spool 24 to thereby form a frustum of a hollow cone. This configuration of the small diameter part of the spool progressively increases the annular area 98 as upstream pressure forces the spool to move in a downstream direction.

The present invention is vandal proof and need not be disassembled should it ever need cleaning. The apparatus is inexpensive to manufacture and enjoys a very long life. The apparatus is reliable, conserves energy, and overcomes many objections found in prior art examples thereof.

I claim:

1. A flow control device having an inlet end which can be connected to a source of fluid flow and an outlet end through which a controlled flow of fluid is discharged;

a retainer housing having an upper body portion from which a skirt extends in a downstream direction, means forming a working cavity within said skirt;

a spool having a cylindrical extension which is reciprocatingly received within said working cavity; means forming a flow passageway which extends from said inlet end, through said retainer housing through said cylindrical extension, and to said outlet;

a flat annular wave spring means mounted in interposed relationship between said retainer housing and said spool;

said spring means, retainer housing, and spool being arranged whereby increased upstream pressure moves said spool and retainer housing skirt towards one another, thereby compressing said spring means and storing energy therein while reducing the area of said flow passageway, while decreased upstream pressure causes the spring means to urge the housing skirt in a direction away from the spool to thereby reduce the friction to flow through the flow control device;

said flow passageway through said cylindrical extension is a lateral flow port formed through the sidewall thereof so that said skirt member slidably covers said lateral port as said retainer housing compresses said annular spring means;

said flow passageway through said retainer housing includes a longitudinal flow port formed through said skirt, said longitudinal flow port terminates adjacent to said annular spring means.

2. The flow control device of claim 1 wherein the circumferentially extending lower marginal end of said skirt is turned inwardly to provide a flange against which said spring means is received.

3. The flow control device of claim 2 wherein said annular spring means is in the form of a bent-up washer having a sinusoidal wave pattern about the circumference thereof.

4. A flow control device having an inlet end for attachment to the outlet end of a faucet; and an outlet end through which a regulated flow of fluid exists;

a retainer housing, a spool, and a spring means axially aligned respective to one another and received in axial aligned relationship respective to one another;

said spool includes a large outside diameter part and a small outside diameter part; said retainer housing includes an upper part from which a skirt member depends, said small outside diameter part of said spool is reciprocatingly received within said retainer housing;

said spring means is in the configuration of a flat annular wave member; said spring means is received between said large diameter part of said spool and the lower end of said skirt to cause energy to be stored in said spring means when relatively high pressure moves said spool and retainer housing towards one another; and, said spring means thereafter causes said spool and retainer housing to move away from one another when relatively low upstream pressure is effected thereon;

a flow passageway means formed from the inlet end, and through said retainer housing; a lateral flow port formed through said spool, and into communication with the outlet end, said skirt moves to close said lateral flow port when the spring is compressed and said skirt moves to open said lateral flow port when the spring is uncompressed by the upstream pressure;

said small diameter part of said spool is a cylindrical extension;

said annular spring means is in the form of a bent-up washer having a sinusoidal wave pattern about the circumference thereof;

said lateral flow port is formed through said cylindrical extension which is formed through the sidewall thereof so that said skirt member slidably covers said lateral port as said retainer housing compresses said annular spring means;

said flow passageway through said retainer housing includes a longitudinal flow port formed through said skirt, one end of said longitudinal flow port terminates adjacent to said annular spring means.

5. The device of claim 4 wherein the circumferentially extending lower marginal end of said skirt is turned inwardly to provide a flange against which said spring means is received.

6. The device of claim 5 wherein said annular spring means is in the form of a bent-up washer having a sinusoidal wave pattern about the circumference thereof.

* * * * *